United States Patent
Gillett

(10) Patent No.: US 10,245,937 B2
(45) Date of Patent: Apr. 2, 2019

(54) VEHICLE COMPRISING AUTONOMOUS STEERING COLUMN SYSTEM

(71) Applicant: Carla R Gillett, Sacramento, CA (US)

(72) Inventor: Carla R Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 0 days.

(21) Appl. No.: 15/451,405

(22) Filed: Mar. 6, 2017

(65) Prior Publication Data

US 2017/0190335 A1 Jul. 6, 2017

Related U.S. Application Data

(63) Continuation of application No. 13/872,054, filed on Apr. 26, 2013, now Pat. No. 9,586,471.

(51) Int. Cl.
*B60K 7/00* (2006.01)
*B62K 11/02* (2006.01)
(Continued)

(52) U.S. Cl.
CPC .......... *B60K 7/0007* (2013.01); *A63C 17/014* (2013.01); *A63C 17/12* (2013.01);
(Continued)

(58) Field of Classification Search
CPC .......... B60W 50/082; B60W 2420/52; B60W 2710/20; B60L 11/1822; B60L 2200/12;
(Continued)

(56) References Cited

U.S. PATENT DOCUMENTS

| 7,610,131 | B2 * | 10/2009 | Kojima | A63H 17/16 340/465 |
| 8,825,254 | B2 * | 9/2014 | Kobashi | B62H 1/12 701/22 |
| 2008/0295595 | A1 * | 12/2008 | Tacklind | A61G 5/14 73/462 |

* cited by examiner

*Primary Examiner* — John D Walters

(57) ABSTRACT

The present invention is an electric mobility vehicle such as a powered knee walker, scooter, bicycle and a multi-passenger vehicle comprising a unique steering column assembly capable of being manually steered also autonomously steered by means of steering actuators. The vehicle user can select a manual drive mode option to operate the vehicle physically or the user can select an autonomous drive mode each mode allows the vehicle to operate more efficiently both indoors and outdoors. The vehicle is configured with a platform for standing, sitting and leaning, and the framework is configured with a front and rear drive system, the front drive system incorporates the steering column and one or more steering actuator which control front and rear propulsion systems. The propulsion includes; a DC powered truck module, a fork module, or a cantilever module, and each respectively comprise a drive motor, brake, sensor and accelerometers for self-balancing control. The steering column controlling system is the main driving force of the vehicle and utilizes wireless interface communication linked to short range proximity sensors including LIDAR or laser sensor unit, cameras, and handlebar throttles comprising grip force sensor to control speed and braking, and other vehicle devices. The steering column and framework contain an array of USB power cabling interconnecting electrical components to an IO communication network and to an electrical control system and battery bank.

20 Claims, 8 Drawing Sheets

(51) Int. Cl.

| | |
|---|---|
| *B62K 21/12* | (2006.01) |
| *G05D 1/10* | (2006.01) |
| *B60K 17/30* | (2006.01) |
| *B60K 31/00* | (2006.01) |
| *G05D 1/02* | (2006.01) |
| *B62K 11/00* | (2006.01) |
| *B60B 19/00* | (2006.01) |
| *B62K 25/02* | (2006.01) |
| *G05D 1/00* | (2006.01) |
| *A63C 17/01* | (2006.01) |
| *A63C 17/12* | (2006.01) |
| *B60L 11/18* | (2006.01) |
| *B60W 50/08* | (2012.01) |
| *B62J 99/00* | (2009.01) |
| *B62K 5/08* | (2006.01) |
| *B62K 17/00* | (2006.01) |
| *B62K 21/26* | (2006.01) |
| *B62K 23/02* | (2006.01) |

(52) U.S. Cl.
CPC ............ B60B 19/003 (2013.01); B60K 17/30 (2013.01); B60K 31/0058 (2013.01); B60L 11/1822 (2013.01); B60W 50/082 (2013.01); B62J 99/00 (2013.01); B62K 5/08 (2013.01); B62K 11/007 (2016.11); B62K 11/02 (2013.01); B62K 17/00 (2013.01); B62K 21/12 (2013.01); B62K 21/26 (2013.01); B62K 23/02 (2013.01); B62K 25/02 (2013.01); G05D 1/0016 (2013.01); G05D 1/0088 (2013.01); G05D 1/0231 (2013.01); G05D 1/0257 (2013.01); G05D 1/0276 (2013.01); G05D 1/0278 (2013.01); *A63C 2203/12* (2013.01); *B60K 2007/0038* (2013.01); *B60K 2007/0092* (2013.01); *B60L 2200/12* (2013.01); *B60W 2420/52* (2013.01); *B60W 2710/20* (2013.01); *B60Y 2200/91* (2013.01); *B62J 2099/004* (2013.01); *B62J 2099/0013* (2013.01); *B62K 2204/00* (2013.01); *B62K 2207/00* (2013.01); *B62K 2207/02* (2013.01); *B62K 2207/04* (2013.01); *B62K 2700/22* (2013.01); *G05D 2201/0206* (2013.01)

(58) Field of Classification Search
CPC ................ B62J 99/00; B62J 2099/0013; B62J 2099/004; B62K 5/08; B62K 11/02; B62K 11/12; B62K 11/14; B62K 17/00; B62K 21/12; B62K 21/26; B62K 23/02; B62K 2207/00; B62K 2207/02; B62K 2207/04; B62K 25/02; B60K 7/0007; B60K 17/30; B60K 31/0058; B60B 19/003; A63C 17/014; A63C 17/12; G05D 1/0016; G05D 1/0088; G05D 1/0231; G05D 1/0257; G05D 1/0276; G05D 1/0278
USPC ................................................. 180/167, 65.51
See application file for complete search history.

VEHICLE COMPRISING AUTONOMOUS STEERING COLUMN SYSTEM

CROSS REFERENCED TO RELATED APPLICATIONS

A notice of issuance for a continuation in part patent application in reference to patent application Ser. No. 13/872,054, filing date: Apr. 26, 2013, title: "Robotic Omniwheel," and patent application Ser. No. 12/655,569, filing date: Jan. 4, 2010; titled: "Mode of Transportation Type Having Inner-Motorized Omniwheel Apparatus and Method of Control," and also U.S. Pat. No. 8,430,192 B2, titled: "Robotic Omniwheel Vehicle".

FIELD OF THE INVENTION

The present disclosure pertains generally to semi-autonomous vehicles configured with a powered steering column system to transport one or more users, more particularly the present invention discloses a DC propulsion system employing front and rear truck modules, fork modules and cantilevered modules comprising one or more self-balancing steering actuators controlling hub wheel assemblies.

BACKGROUND

While the currently available personal transporters offer scooters, bicycles and walkers providing manual steering they also are dangerously unstable for example a knee walker requires pushing and steering while trying to keep balance on one leg, and generally the person has to lean against the knee walker when the supporting leg becomes weak, whereas features of the present disclosure eliminate the drawbacks in these mobility issues. Alternatively, the person may be mobile however manual self-propelled walkers and powered scooters that are manually steered typical of today most likely do not include mode selections utilizing autonomous control system with self-balancing mode, fall prevention mode and operational control modes.

SUMMARY

In accordance, the present vehicle comprising autonomous steering column system offers improvements to electric mobility vehicles such as knee walkers, a powered knee scooter, scooters, bicycles, carts and multi-passenger vehicle, as well as mobility vehicles empowering the user to have comfort and drive control options by selectively engaging a manual drive mode or an autopilot mode, and accordingly by doing so the user may navigate the vehicle by manually steering using grip handles including speed and brake control throttles, or the user can disengage manual drive to engage an autonomous control system. For this purpose, the autonomously control system within the vehicle structure systematically employs a LIDAR unit to scan navigational parameters and employs I/O interface, CPU, GPS, cameras and other sensor units connectively active with WIFI/Bluetooth and Cloud base management during the autopilot process. The mobility vehicles disclosed may be constructed with varied manufacturing framework processes to include a control module in communication with front and rear propulsion systems comprising: powered truck modules, fork modules and cantilevered modules integrated with steering column and steering actuator arrangements. These and other technological advancements will become apparent upon reading the following description and upon reference to the vehicle embodiments.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

Figure 5A:
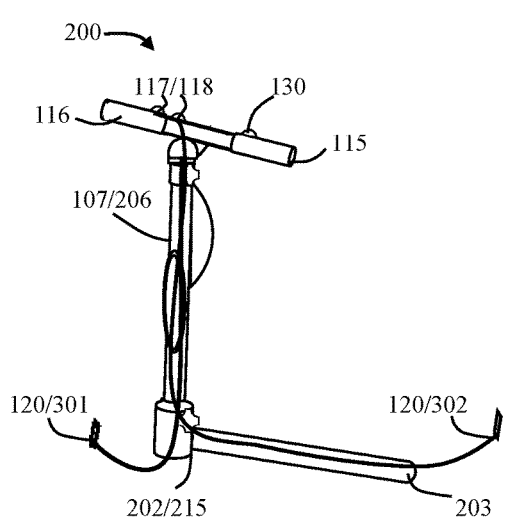
FIG. 5A illustrates a perspective see through side view of a powered steering column coupled to supportive framework of a vehicle comprising autonomous steering column system.
Figure 5B:
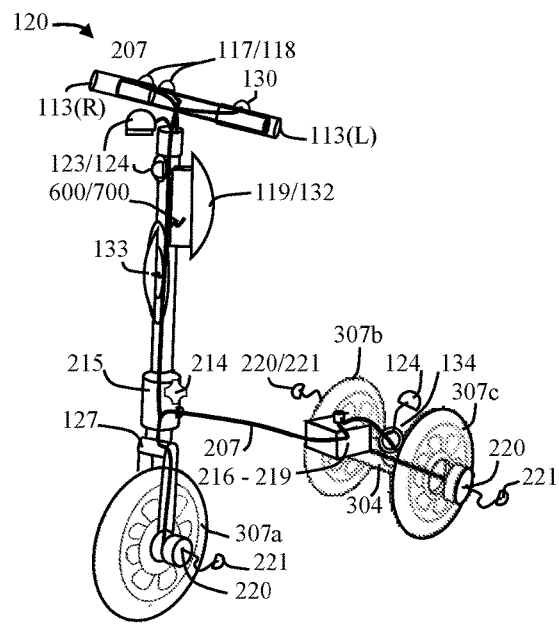
FIG. 5B illustrate a see-through view of steering column and framework assemblage internally wired to an array of electrical components of the present embodiment of a vehicle comprising autonomous steering column system.
Figure 5C:
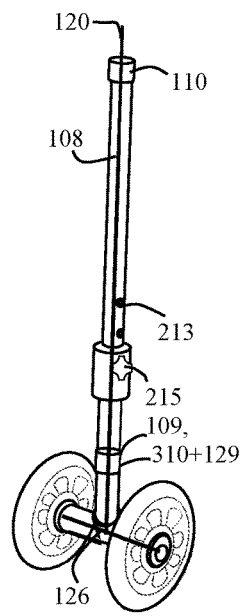
Figure 5D:
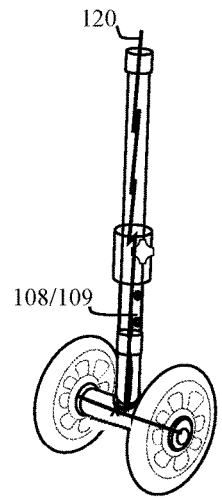
Figure 6A:
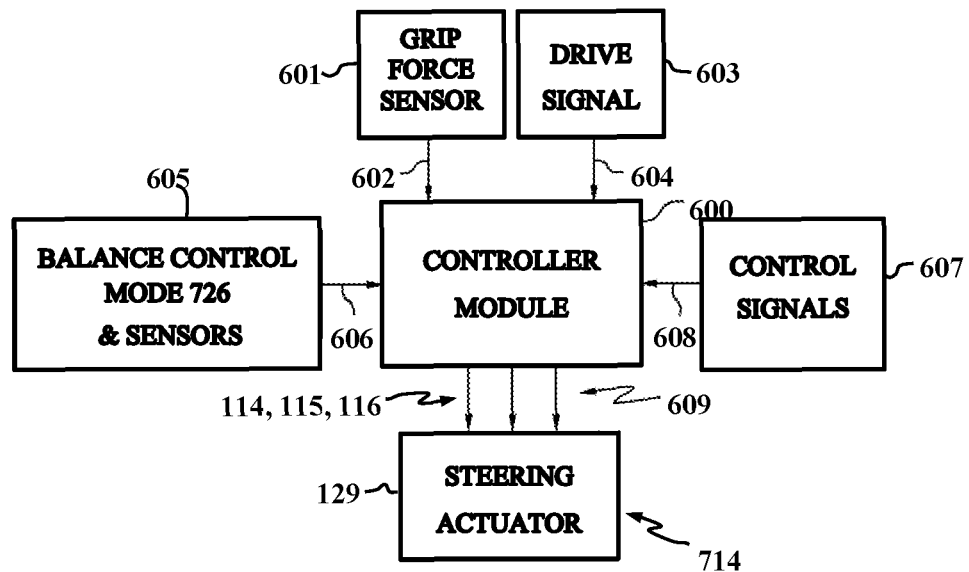
Figure 6B:
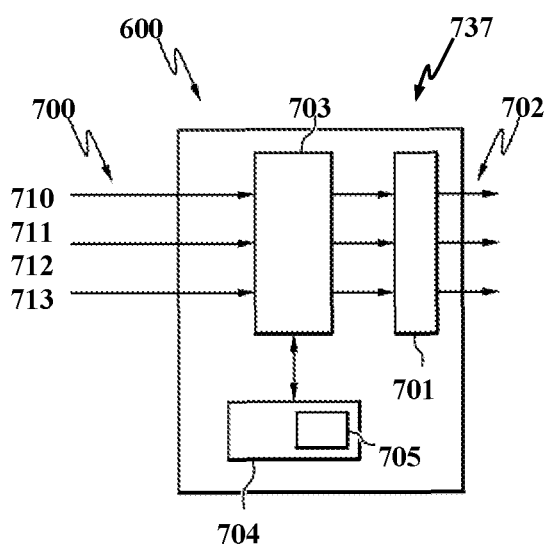
Figure 7:
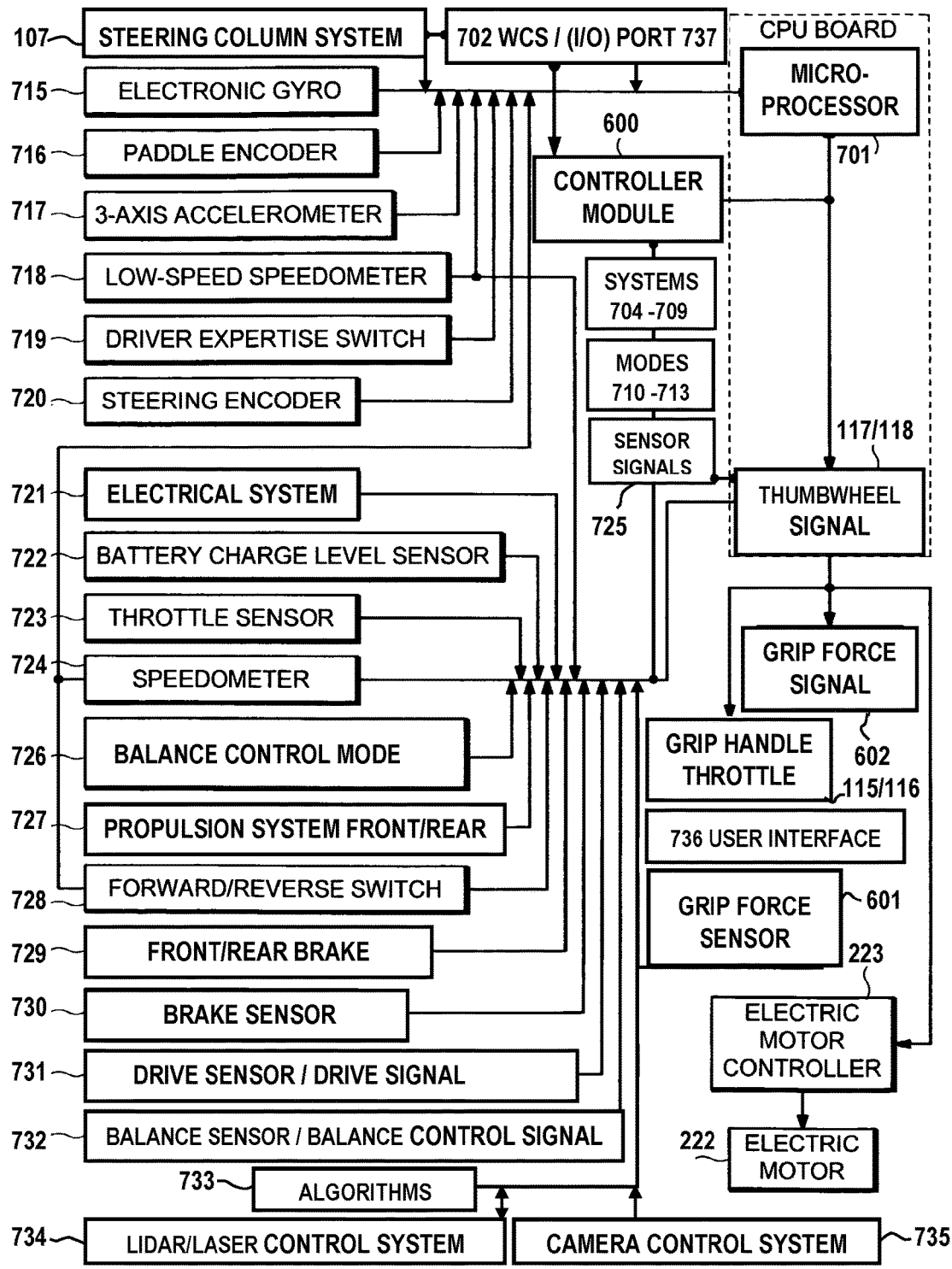

As FIG. 5C and FIG. 5D show in both embodiments the steering column 109 which is constructively configured with an adjustable stem 110 of a vehicle comprising autonomous steering column system;

FIG. 6A depicts a schematic illustration of an electrical control system according to one or more embodiments of a vehicle comprising autonomous steering column system;

FIG. 6B depicts a schematic illustration of a controller module of a mobility vehicle according to one or more embodiments of a vehicle comprising autonomous steering column system;

FIG. 7 is a schematic diagram of a computing system 700 of the present embodiment vehicle comprising autonomous steering column system.

DETAILED DESCRIPTION OF THE DRAWINGS

While this invention is susceptible of embodiment in many different forms, there are shown in the drawings and will herein be described in detail representative embodiments of the vehicle comprising autonomous steering column system with the understanding that the present disclosure is to be considered as an exemplification of the principles of the invention and is not intended to limit the broad aspect of the invention to the embodiments illustrated. To that extent, elements and limitations that are disclosed, for example, in the figures, abstract, and detailed description but not explicitly set forth in the claims, should not be incorporated into the claims, singly or collectively, by implication, inference or otherwise.

While the invention is susceptible to various modifications and alternative forms, specific embodiments are shown by way of example in the drawings and will be described in detail herein. It should be understood, however, that the invention is not limited to the particular forms disclosed. Rather, the invention is to cover all modifications, equivalents, and alternatives falling within the spirit and scope of the invention.

Respectively the vehicle comprising autonomous steering column system or a vehicle 100 such as scooters, walkers, wheelchairs or combinations thereof can advantageously be applied in various configurations and terms for example; a "knee walker," "scooter," "cart," can also be referred as "bicycle", "multi-passenger vehicle," "vehicle," or "mobility vehicles", in view of that, "semi-autonomous" "autonomous," and "autopilot," vehicle 100 can be formulated with equivalent construction, component assemblage and manufacturing methods described in detail by reference in entirety herein.

The drawings presented herein are not to scale and are provided purely for explanatory purposes. Thus, the individual and relative dimensions and orientations shown in the drawings are not to be considered limiting. In addition, the use of spatial adjectives in the specification and claims, such as "front," "rear," "end," "upward," "downward," "vertical," "horizontal", etc., are intended, unless explicitly indicated otherwise, to specify the comparative orientation of a given component relative to the manually driven and semiautonomous driven mobility vehicles 100. An autonomous control system 700 comprising methodologies for manual drive mode 701 and autopilot drive mode 702 detailed in FIG. 7.

As specified in the descriptions for "truck module," "fork module," and "yoke module," the numbering varies pertaining to the configuration page and each when applied can be referred to as "ground contacting members," and "modules".

Figure 1A:
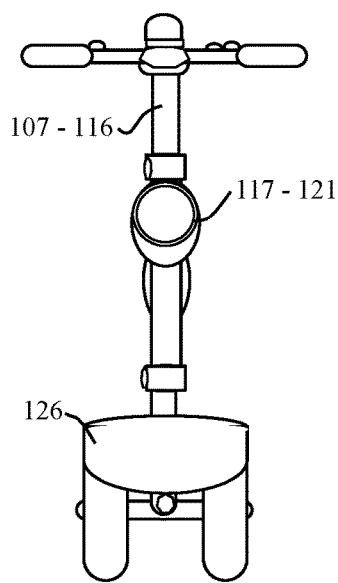
FIG. 1A is a view as seen by a user of a DC powered steering column system configured with a powered truck module.
Figure 1B:
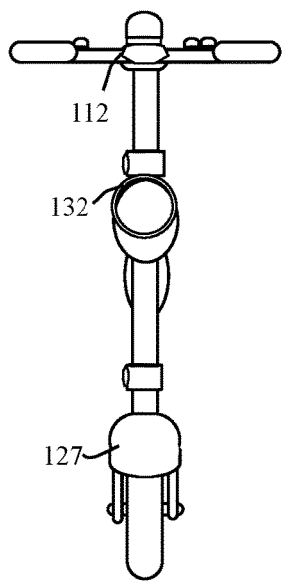
FIG. 1B is a view as seen by a user of a DC powered steering column system configured with a powered fork module.
Figure 1C:
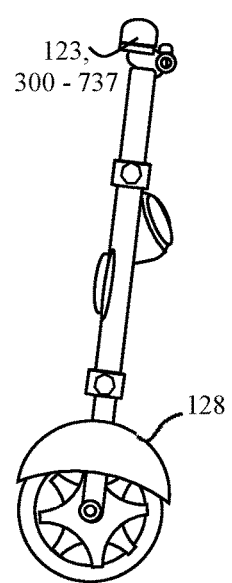
FIG. 1C is a side view of a DC powered steering column system.

Referring now to FIG. 1 depicts a manual and autonomous controlled "steering column system," or also referred to as a "steering column" 107. The three embodiments illustrated depict: FIG. 1A a front view of a truck module 116 integrated with steering column 107; FIG. 1B a front view of a fork module 117 integrated with steering column 107, and FIG. 1C a side view representative of either a truck module 126, a fork module 127, or a cantilevered module 128 integrated with the steering column 107. In elements of the steering column 107 a top section of the stem 108 is rigidly attached to a handlebar 112 by bracket 111 and a stem coupling 110 shown by arrow (A1) representing a fixed handlebar 112 in place atop a stem 108 on the steering column's upper section, and when needed the handlebar 112 can be uncoupled for storage. The handlebar 112 is operably turned manually by the user 105 when in a manual drive mode 701, accordingly the user securely grips the handles or a grip handle 113(R) right or 113(L) left, there may also a need to use a steering wheel 312 option for user 105 to hold on to during vehicle navigation, the steering wheel 403 is depicted in FIG. 4C for controlling truck module configured with a wide axle 305.

In further detail, FIG. 2A through FIG. 2D configurations depict: a knee scooter 101; a scooter 102; and bicycle 103, and a multi-passenger vehicle 104 for supporting a "rider," "operator," "user," and "passenger" (not depicted in the drawings). The frame 106 supports the user 105 who is either standing, leaning or sitting depending on the manufacturing process 200 of the framework 201 arrangements having a front end 202 and a rear end 203; and the frame's middle section is encompassing the platform 204 and the base 205.

In one element the handlebar 112 is operably turned manually by the user 105 when selected, the left grip handle 113a of the handlebar 112 allows user 105 to grip and rotate the brake throttle 115, wherein a grip handle sensor 114 is activated to signal grip force activity of brake throttle 115. In one element the brake throttle 115 is employed to slow and stop the vehicle 100 and accordingly, the left grip handle is operably turned forwardly by the user 105 to activate brake pressure within the hub wheel brake assemblies which the brakes 218 are monitored by a brake sensor 219, see FIG. 5B.

In one element the handlebar 112 is operably turned manually by the user 105 when selected, the right grip handle 113b of the handlebar 112 allows user 105 to grip and rotate a speed throttle 116 forwardly to adjust velocity speeds of the vehicle 100 and wherein, a grip handle sensor 114 is activated to signal grip force activity of speed throttle 116, for details see FIG. 6A and FIG. 6B.

In another element the user 105 can engage manual drive by the applying thumb pressure on the manual drive thumbwheel 117, and to engage an autonomous drive control system 700 see FIG. 7, the user 105 can apply thumb pressure on the autopilot drive thumbwheel 118.

In various elements the user selectively engages a manual drive mode 701 and an autopilot drive mode 702 which are actively switched ON and OFF by means of the vehicle's ignition thumbwheel switch 130, for operation access the user requires security code and password protection via a security code process 131 which is unlocked upon the user entering password pin in the security code process 131, the user manually selects options on the control panel's LED touchscreen 132.

In various elements, notably the manual drive mode 702 option is best suited when operating the knee scooter 101 and the scooter 102 indoors. For this purpose, the user 105 can start the vehicle and engage the manual drive mode 702 by the applying thumb pressure on the manual drive thumbwheel 117 the user 105 is then able to traditional steer the vehicle by applying common actions to pivot the handlebar 112, and upon doing this a front propulsion system 124 and the steering actuator 129 of the steering column work by assisting the user, in this way power steering and powered propulsion wheels makes it so easy to steer in tight spaces. The rear propulsion system 301 and rear steering actuator 129 are best utilized when using the vehicle outdoors to travel on step hills, this process works best for the bicycle 103. Vehicle 104 is most likely would utilize autopilot drive mode 702 and the vehicle's construction would utilize a steering wheel for user continence, the steering wheel would incorporate the thumbwheel on the central section of the steering yoke in view of the user see more details in FIG. 5A. Vehicle 104 can be reconfigured with a longer, wider frame, platform, and base to accommodate seating for several passengers and it would be obvious to one skilled in the art to add additional seating and a body with doors and windows e.g., a two seater is exampled in FIG. 4D without a body.

As FIG. 2A-FIG. 2D illustrate, in general the vehicles 101, 102 103, and 104 can be structured for both indoor and outdoor use and in these environments primarily the vehicle user and the autonomous control system 700 can systematically employ an environmental scanner such as a laser/LIDAR sensor unit 123 to scan navigational parameters and would employ I/O interface, CPU, GPS, cameras 124 situated on the front and rear sections of the steering column system, and may utilize other sensor units disclosed in FIG. 7 and FIG. 8 which are connectively active with WIFI/Bluetooth and Cloud respective of autopilot drive mode 702 processes, detailed in FIG. 7. The computing system 121 of FIG. 5A when in employed is communicating with a propulsion system 300 utilizing front 124 and rear 125 propulsion hub wheel 306 assemblies.

In various embodiment the environmental scanner or "scanner," is a laser system 800 utilizing a steerable laser system configured to project a laser beam and configured to use information about the orientation of the vehicle received from the orientation sensor to stabilize the laser beam detailed in FIG. 7.

As FIG. 2A-FIG. 2D show various versions of a vehicle comprising an autonomous steering column system, the mid-section of the steering column 107 is also configured with a control panel 119 placed in view of the user 105 as the user is standing and sitting, respectively the control panel 119 is configured with a LED touchscreen for the user 105 actively accesses operations of a CPU computing system 121 which is housed with said control panel 119. The control panel 19 housing the CPU computing system 121 which is actively connecting to a short range laser/Lidar sensor unit 123 with rotating platform situated at the capital is coupled 110 to stem shown by arrow (A2), various actuator and sensor elements and an array of USB power cable 207 is connecting the aforementioned steering column components inside conduit 206 of the framework 201, for this reason the wiring is concealed and protected, the cabling harness of electrical wiring is clearly detailed in FIG. 5B.

Figure 2A:
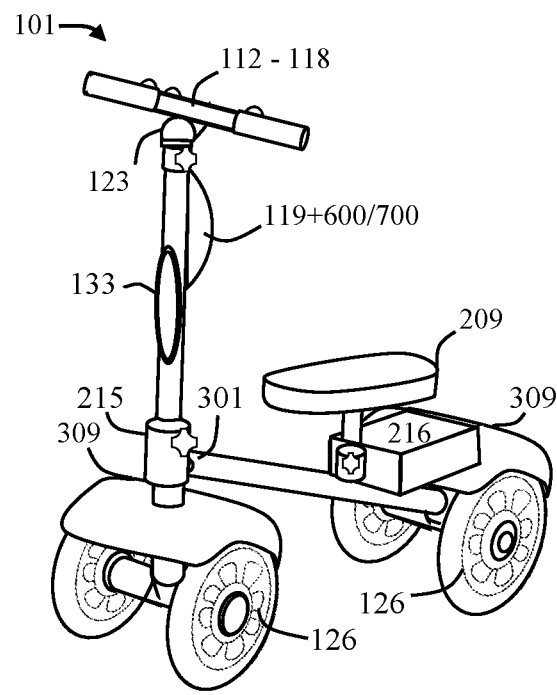
FIG. 2A is a perspective view of a knee scooter 101.
Figure 2B:
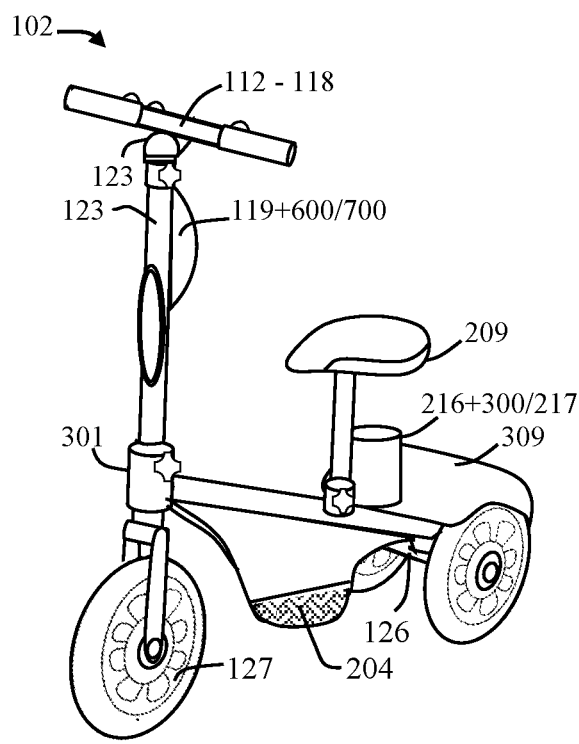
FIG. 2B is a perspective view of a scooter 102.
Figure 2C:
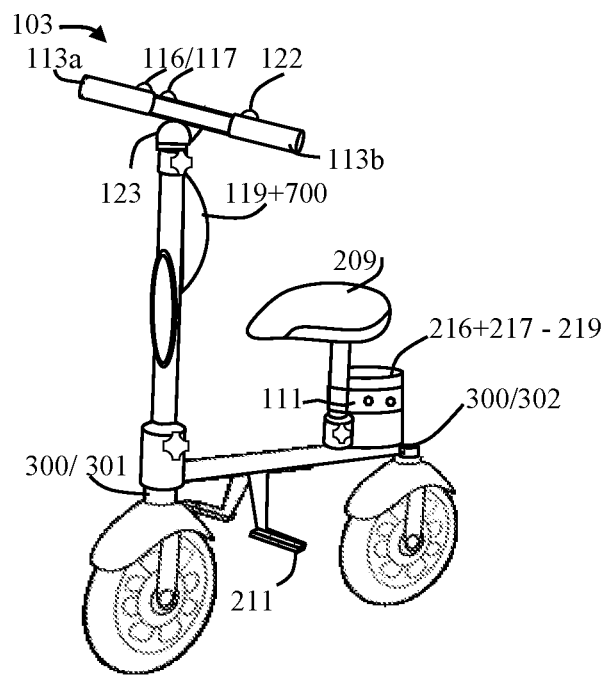
FIG. 2C is a perspective view of a multi-passenger vehicle 103.
Figure 2D:
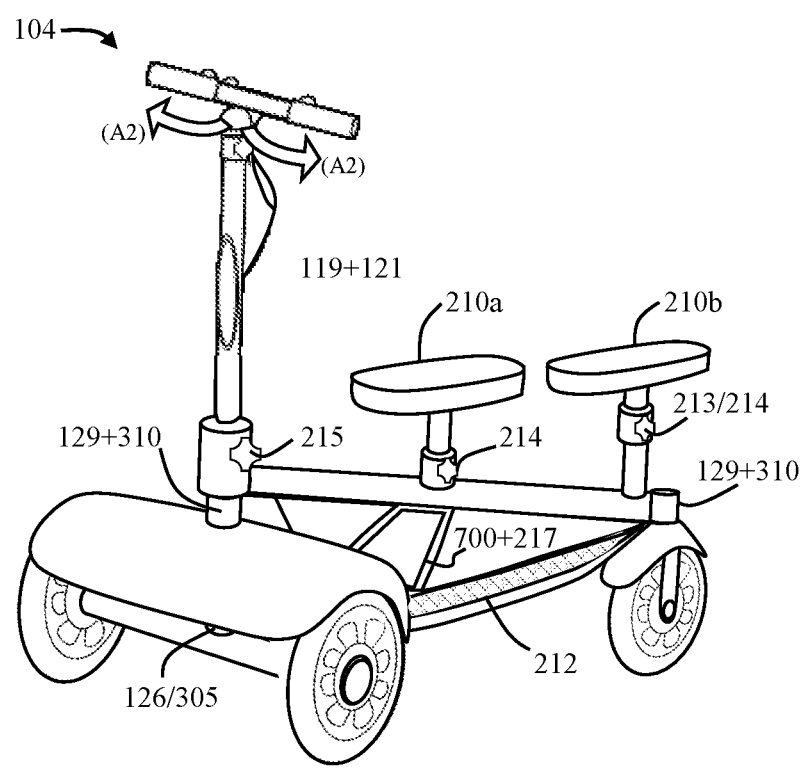
FIG. 2D illustrates a perspective side view of a bicycle 104.

As FIG. 2-FIG. 2D illustrate, in general the handlebar 112 is actively used to turn the steering column 109 easier to the vehicle's 101, 102, and 103.

In various embodiments FIG. 2A shows a knee scooter 101, and FIG. 2A shows the scooter 102 which either may be configured with one or more truck modules, fork modules and a yoke module which can be arranged either on the front frame end 202 and arranged or on the rear frame end 203, the "modules" can be arranged on either end are coupled to steering actuators 129a and 129b, e.g., for right and left steering actuator directions, as well as the handlebar 112 is depicted, e.g., for right and left steering directions of the steering column 107 when structured for manual drive mode when driven by the operator/user, and when structured for autopilot drive mode to assist the user via an autonomous control system 700 detailed in FIG. 7, and a controller module 600 detailed in FIG. 6A to assist the user 105.

In various embodiments FIG. 2B shows a scooter 102, the scooter 102 which either may be configured with one or more truck modules, fork modules and a yoke module which can be arranged either on the front frame end 202 and arranged or on the rear frame end 203, the "modules" can be arranged on either end are coupled to steering actuators 129a and 129b, e.g., for right and left steering actuator directions, as well as the handlebar 112 is depicted, e.g., for right and left steering directions of the steering column 107 when structured for manual drive mode when driven by the operator/user, and when structured for autopilot drive mode to assist the user.

As FIG. 2B shows one or more elements of the scooter 102 the truck module 126 can be arranged on either end is coupled to steering actuators 129a and 129b, e.g., for right and left steering actuator directions, as well the fork module 127 can be arranged on either end is coupled to steering actuators 129a and 129b, e.g., for right and left steering actuator directions. The cantilever module 128 may also be employed and to be arranged on either frame ends and respectively coupled to steering actuators 129a and 129b, e.g., for right and left steering actuator directions.

In one elements of the scooter 102 the handlebar 112 is depicted, e.g., for right and left steering directions of the steering column 107 when structured for manual drive mode 701 when driven by the user 105, and when structured for autopilot drive mode 702 is to be automatically employed via the autonomous control system 700 to assist the user 105, and the controller module 600.

As FIG. 2B shows the handlebar 112 respectively being used to turn the steering column 107 by the user 105, the user can use the grip handles 113a and 113b situated on opposing ends of said handlebar 112 to lean on when the autopilot drive mode is controlling the scooter 102. In one element, the handlebar 112 is used to turn the steering column 109 when in manual drive mode to accordingly steer the vehicle 103 however, if an issue is detected the autonomous control system 700 activates automatically.

As FIG. 2C shows the bicycle 103 can be structured to utilize both manual drive mode 701 and autopilot drive mode 702 to assist user 105. The handlebar 112 respectively being used to turn the steering column 107 by the user 105, the user can use the grip handles 113a and 113b situated on opposing ends of said handlebar 112 to lean on when the autopilot drive mode is controlling the bicycle 103.

In one element, the handlebar 112 is used to turn the steering column 109 when in manual drive mode to accordingly steer the vehicle 103 however, if an issue is detected the autonomous control system 700 activates automatically.

In FIG. 2C the bicycle 103 is configured front and rear propulsion and wheel assemblies comprising fork module 127a and fork module 127b each comprising one lateral disposed hub wheel 307 for forward and reverse propulsion. As shown, the bicycle 103 is configured with a compartment 216 to house one or more components of the bicycle 103, and the bicycle seat bar 208 being configured to position the seat 209 higher allowing the user to rest his or her feet on footrest 211a and 211b.

The fork modules of the bicycle can be arranged on the front frame end 202 and arranged on the rear frame end 203, and an electrical system 217, a DC battery bank 218, and a battery charger 219 are housed within the compartment 216 provide the power source to the bicycle propulsion system 300.

As FIG. 2D shows the vehicle 104 carries multi-passengers for this reason the vehicle requires a front propulsion system and a rear propulsion system for additional power to steer a truck module 203 for the supporting multi-passenger. The framework 201 is comprised of hollow conduit 206 "tubing" fabricated with metal, carbon fiber, plastic and a combination thereof. In various elements the framework 201 tubing arrangement is contoured having an underlying surface characterized by a center of mass to support the weight of a user 105, passengers, and the weight of components. The framework 201 middle section is configured with a seating bar 208 supporting a seat type 209 or 210 and supporting attached footrest's 211a and 211b the footrest having raised skid patterns 212 for traction, different scenarios are possible according to a manufacturing process 200.

The truck module 126 can be arranged on the front frame end 202 and arranged on the rear frame end 203, the truck module 126 arranged on either end is coupled to steering actuators 129a and 129b, e.g., for right and left steering actuator directions, as well as the handlebar 112 is depicted, e.g., for right and left steering directions of the steering column 107 when structured for manual drive mode 701 when driven by the user 105, and when structured for autopilot drive mode 702 to assist the user.

In one element, the platform's 204 body is formed with smooth saddled like curves so that the user 105 is able to sit on a seat 209/210 to ride with legs straddled or ride side saddle thus having both legs rest on one side, and located on the bottom of each side of the platform 204 there are left and right footrests 211a, 211b and accordingly the footrest 211 are attached in place via a manufacturing process 200 and may include a traction skid patterns 212.

In one element, the seat bar 208 being configured with sliding slots with tapped holes 213 and a nob bolt 214 configured to raise and lower the seat up or down then lock it in place, and for removing the seat, the seats 209 and 210 can be fabricated arrangement varies in the manufacturing process 200.

In one element, the framework 200 incorporates the steering column 107 illustrated in FIG. 1 perceptively the steering column system 107 is pivotally mounted to the front end 202 of the framework for structural support, the front end 202 is rigidly connected to the steering column 107 via tapped stem holes 213 which is configured to lock the steering column stem in place with nob bolt 214 within a coupling joint 215 and when needed the steering column can be removed from the frame for storage or replacement.

In general FIG. 2A through FIG. 5B illustrate framework elements of the vehicle structure and framework 200 operatively engaged with a propulsion system 300. In general, a front propulsion wheel assembly 301 for forward and reverse and a rear propulsion wheel assembly 302 for forward and reverse propulsion generate four-wheel drive mainly for traveling off road and traveling up and down steep hills. Accordingly, front and rear propulsion wheel assembly's rigidity affix on the framework arrangement 201 situated on the front end 202 and on the rear end 203 by a coupling joint 215, when needed the coupling joint 215 can be unlocked to remove bulky wheel assemblies for storing.

In perspective, FIG. 4C shows front and rear propulsion wheel assemblies are rigidity affixed to a steering actuator 129 as shown by arrows (A4), and hub wheels steering motion arrows (A5).

In the embodiments of FIG. 3A through FIG. 3F perspective views shows the propulsion system 300 arrangements oriented on the framework ends 202, and 203, and in various ways both front and rear propulsion wheel assemblies can include a truck module 126, a fork module 127, and a cantilever module 128 which are referenced herein as "ground contacting members 303".

Figure 3A:
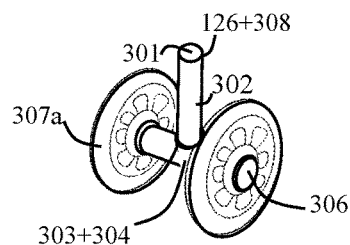
FIG. 3A through FIG. 3F illustrate perspective-views of a powered truck, powered fork and cantilever yoke modules, and a wide truck module steering wheel of a vehicle comprising autonomous steering column system.
Figure 4A:
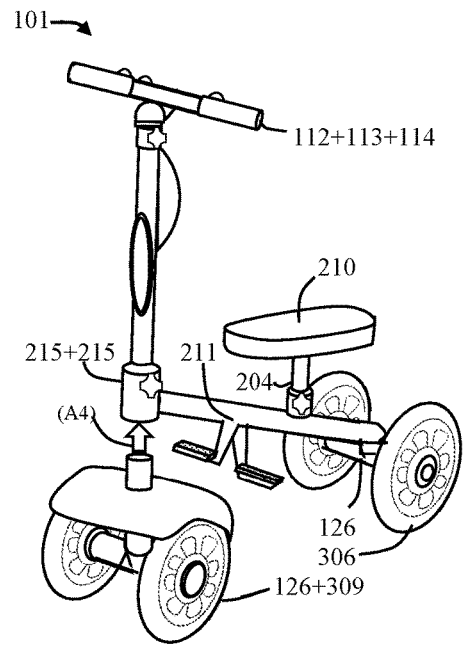
FIG. 4A illustrates a perspective side view of a vehicle comprising autonomous steering column system.
Figure 4B:
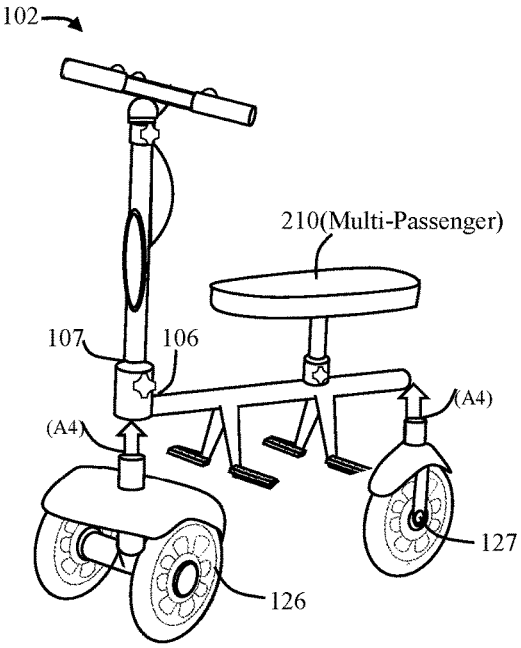
FIG. 4B illustrates a perspective side view of a vehicle comprising autonomous steering column system.
Figure 4C:
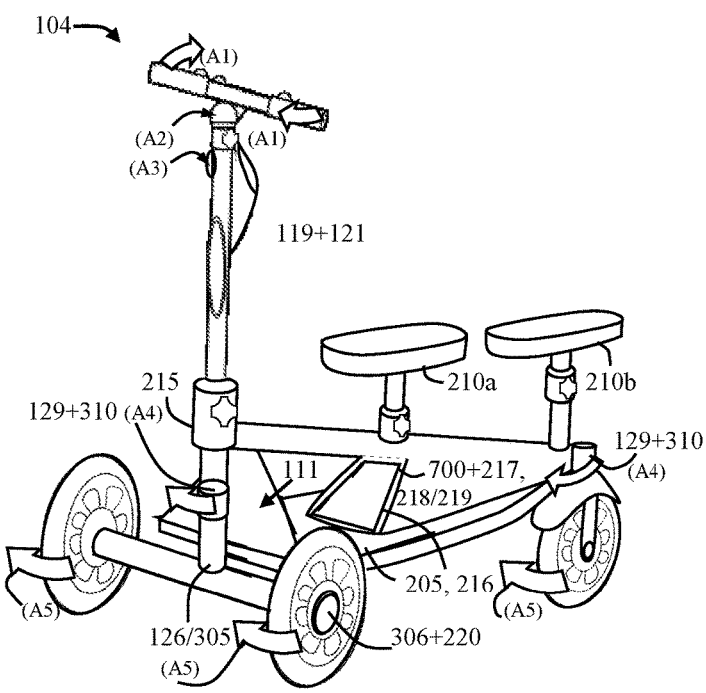
FIG. 4C is a perspective view of a multi-passenger mobility vehicle 103 frame configuration with base and compartment.

As FIG. 1A and FIG. 3A show, in one embodiment the truck module 126 is configured with an elongated conduit 301 situated inside a yoke 302 accordingly a yoke conduit 303 is configured to couple onto the axle and hub assemblies 308, as well the yoke conduit 303 can be coupled to front and rear steering actuators 129 e.g., for referencing see FIG. 4A and FIG. 4C, and a narrow axle 304 is constructively configured to rotably couple onto right and left hub wheel assemblies, the is wired within via a horizontal yoke conduit 303.

Figure 3B:
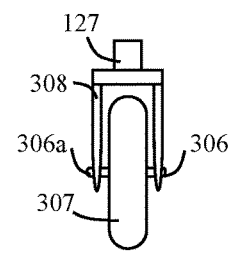

As FIG. 1A and FIG. 3B show in one embodiment the yoke module 127 can be constructively configured to rotably couple onto the front and rear steering actuators 129 for referencing see FIGS. 4A-4C.

Figure 3C:
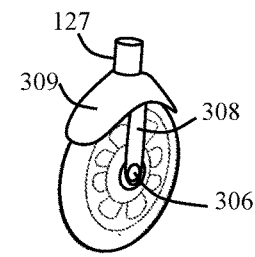
Figure 3D:
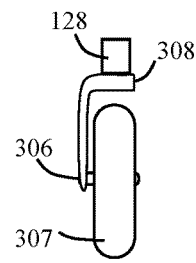
Figure 3E:
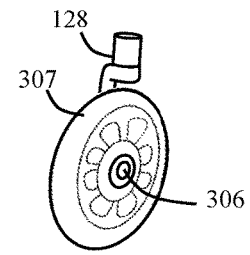

As FIG. 3D and FIG. 3E show in one embodiment the cantilever module 128 may be constructively configured to rotably couple onto the front and rear steering actuators 129 for referencing see illustration FIG. 1C and FIG. 4B perceptively shows how one embodiment where the cantilever module 128 can be constructively configured to rotably couple onto the rear steering actuator 129, and one skilled in the art the cantilever module may be coupled to the front steering actuator as well, this arrangement would be well suited for the bicycle 103 with foot pedals 211.

Figure 3F:
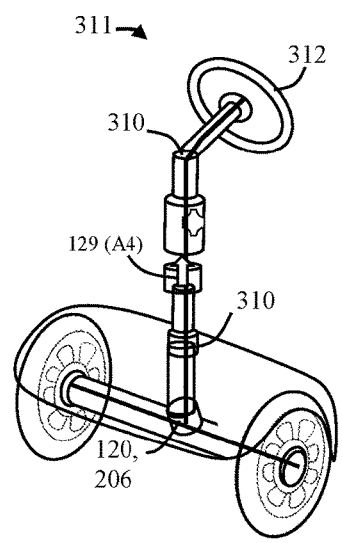

In greater detail, FIG. 3A shows the truck module 126 is configured with an axle 304 e.g., having widths respective of the module, on the other hand in FIG. 3F the truck module is configured with a wide axle 305 respective of the truck module 127 utilized for the multi-passenger vehicle 104, and accordingly each axle 304/305 is constructed with hub assemblies 306, and one or more hub wheels 307, and a yoke 302 which is configured to structurally support the center axis of said axle, the truck, yoke or also referenced as "yoke conduit," or "yoke module", and cantilever modules are internally prewired with accelerometer sensors and USB power cable 207 connecting to the electrical system 217 and battery 218, and the fork module 127 see through view is detailing the yoke conduit 303 concealing the prewired hub wheel assemblies 306 (depicted in FIG. 5B). Respectively the opposing axle ends 304 are rotably attached to hub wheels 307a, and 307b by means of hub assemblies 206a, and 206b. As shown in FIG. 3A, truck module's yoke 302 extends upward, and the yoke conduit 303 is constructively configured to pass through a circular opening of a fender 309 the truck assembly is comprising a coupling mechanism 310 also detailed in FIG. 5A to attached the DC powered truck module with the steering actuator 129 and the yoke 302 being characterized as an inverted "T" or other shape configuration, wherein said yoke 302 containing conduit 301 housing at least that of an accelerometer sensor, USB power cable; and said USB power cable is threaded there through connected with hub wheel drive motors this arrangement is also utilized in the following elements described herein.

In one or more embodiments the fender 309 being configured wider to cover the truck module 126 perceptively covering both hub wheels 307a, 307b, and the fender 309 is narrower to cover the single hub wheel 307 of the fork module 127 and of the cantilever module 128, and also said fender's to cover the front and back areas and to extend across the hub wheel's perimeter.

In greater detail as FIG. 3B shows the fork module 127 is configured with a hub wheel 307 and the hub wheel 307 is supported by an axle and hub assemblies 308, and a coupling mechanism 310, a method for allowing the coupling mechanism 310 to insert in a circular opening of a fender 309.

In greater detail as FIG. 3C shows in one embodiment the fender 309 being configured to cover the fork module 127 perceptively covering the front and back areas situated above the hub wheel 307.

As FIG. 3D shows in one embodiment the cantilever module 128, in greater detail FIG. 3D a cantilever module 128 is configured with a hub wheel 307, and coupling mechanism 310, accordingly the coupling mechanism 310 to inserts in a circular opening of a fender 309, and as shown in FIG. 3E the fender 309 being configured to cover the cantilever module 128 perceptively covering the front and back areas situated above the hub wheel 307.

As shown in FIG. 3F is a see through view showing a steering wheel 312 and a wide axle 305 are configured for the DC powered truck module 126/305, the steering wheel and propulsion system 300 is configured with both a steering actuator to steer as shown by arrow (A4) and the steering actuator with not employed the DC powered truck module 126/305 is steered by a differential drive 311 assembly which is to systematically control the hub wheels 307a and the hub wheel 307b simultaneously either to move forward or in reverse while steering in right and left directions. The wide axle 305 conduit 206 is shown prewired with USB power cable 120 for furnishing DC power the truck module 305 drive motors, brakes and sensors, as shown in FIG. 5B.

In greater detail FIG. 4A a knee scooter 101 is illustrated comprising framework 200 being operatively engaged with a front propulsion wheel assembly 301 configured with truck module 126a comprising two laterally disposed hub wheels 307a, 307b for forward and reverse and a rear propulsion wheel assembly 302 is configured with truck module 126b comprising two laterally disposed hub wheels 307a, 307b for forward and reverse propulsion. As shown, the knee scooter 101 is configured with a compartment 216 to house one or more components of the knee scooter 101, and the seat bar 208 being configured to position the seat 210 lower allowing the user to rest his or her appendage on. The knee scooter is configured with two footrest 211a and 211b.

In greater detail FIG. 4B a scooter 102 comprising framework 200 operatively engaged with a front propulsion wheel assembly 301 configured with truck module 126a comprising two laterally disposed hub wheels 307a, 307b for forward and reverse, a rear propulsion system 300 configured with a fork module 127 comprising one lateral disposed hub wheel 307 for forward and reverse propulsion motion. As shown, the scooter 102 is configured with a compartment 216 to house one or more components of the scooter 102, and the seat bar 208 being configured to position the seat 209 higher allowing the user to rest his or her feet on footrest 211a and 211b.

The front propulsion wheel assembly 301 natural tendency is to steer toward a straight forward position relative to a vertical axis of said steering column 109 and front frame 103. In some elements of the steering column 107 an angle can be adjusted for vehicle's 101 and 102 applications in the manufacturing process, and in the preferred embodiment this angle can set to between approximately one degree and eight degrees (between ~1° and ~8°). Slight increases in this angle causing the vehicle to tilt more aggressively into turns when counter-steering, different scenarios apply, and respectively the bicycle's steering column 109 angle can be adjusted more than eight degrees.

In greater detail FIG. 4C a multi-passenger mobility vehicle 104 configured with the steering column 107 utilizing a handle bar steering, in elements of the steering column 107 a top section of the stem 108 is rigidly attached to a handlebar 112 by a stem coupling 110 which is employed to lock the handlebar 112 in place, and when needed the handlebar can be removed for storage. The handlebar is operably turned manually by the user when selected, the user may securely grip the handlebar when the autonomous control system 700 is engaged by operator/user during operating modes, and a short-range LIDAR sensor 123 with rotating platform is situated at the capital shown by arrow (A2) the LIDAR sensor 123.

In elements of the steering column 107 the vehicle with two user's as shown in FIG. 4C or the steering column being configured with differential drive 311, to signal the steering actuators 129 to rotate the directional of the one or more hub wheels 307 accordingly, and steering wheel 312 may be employed for the multi-passenger vehicle carrying more than two user's, for this reason the weight of two people is demanding therefore the front truck module 126 employs axle 305 to support the multi-passenger vehicle efficiently the steering wheel is illustrated in FIG. 3F.

The middle section of the stem 108 is also configured with a control panel 119 placed in view of the user as the user is standing and sitting, respectively the control panel 119 is configured with a LED touchscreen 132 for user interface, the user actively accesses a CPU computing system 121 which is housed with said control panel 119.

In one element of FIG. 4C a compartment 216 is constructively configured with bracket 111 assembly including nuts and bolts and a hinged cover. The compartment 216 for housing the electrical system 217, battery bank 218 with a battery charger 219. The compartment 216 is rigidly affixed onto the frame's base 205 and the base is assembled with bracket 111, nuts, bolts, etc. connecting to the joint 215 and frame intersection.

As shown in FIG. 4C illustrates the handlebar 112 arrows (A1) show right and left steering directions of the steering column 107 when structured for manual drive mode 701 and when structured for autopilot drive mode 702 to assist user. The truck module arranged on either end is coupled to steering actuators 129a and 129b, e.g., arrows (A4) show right and left steering actuator directions. The truck module 126 is configured with a wide axle 305, the hub assemblies 306 include a right hub wheel 307a and a left hub wheel 307b each is rotably attached, the arrows (A5) show right and left hub wheels 307a and 307b steering directions.

The multi-passenger vehicle seating includes seat 210a and 210b and the coupling joint connecting framework 201.

In greater detail FIG. 5A and FIG. 5B illustrate a perspective see through side view of a powered steering column coupled to supportive electrical system 217 detailed more so in FIG. 5B. The electrical system 217 is shown wired by internally wired cable harness 207, the hard wired connection communicates with a controller module 600 and autonomous control system 700 to instruct a hub wheel controller 223 to engage the hub wheel brake 220 to slow or to stop a drive motor 222, this is achieved by the users grip actions applied to the brake throttle 115 and the speed throttle 116 to control the DC battery 218 power to engage the drive motor 222 situated within the hub wheel assemblies 306, the controller module is detailed in FIGS. 6A and 6B.

FIG. 5A shows steering column framework configured with a coupling joint 215, the coupling joint 215 is constructively configured to connect at the coupling joint 215 at an intersection situated between the frame's front end 202 the steering column 107, the front frame 202, and the steering actuator 129 as well, the steering column's conduit 206 is internally wired with an array of USB power cable 207 harnessed within framework conduit 206.

As FIG. 5A shows steering column framework is configured prewired with harnessed USB power cable 120 is shown threaded through the handlebar, and threaded through the steering column 107 stem sections, and the harnessed USB power cable 120 is shown exiting out the frames rear end 203. The steering column's electrical components are prewired and operatively connected to the electrical system 217 comprising a battery bank 218 and battery charger 219.

In greater detail FIG. 5B shows the steering column 107 and the front frame 202 electrical components include wherein: a headlight 133 which is shown wired and a taillight with turn signals 134, the control panel is shown, the handlebar is shown wired, the thumbwheels on the handlebar are shown wired, the LIDAR unit 123 is shown wired, the camera 124 is also shown wired at the top of the steering column 107 and also wired at the rear of the frame respectively.

In various control elements are accessible on the LED touchscreen panel 132 easily reached by the user 105 to switch ON/OFF selection for a headlight 133 and turn signal lights 134, the headlight 133 is rigidly attached on a middle section of the stem 110, the headlight 133 and turn signal lights 134 are activated by manually swiping a light switch displayed on the LED touchscreen panel 132.

In various the framework 200 includes the headlight 133, and the taillight turn signals 134, and also the DC powered fork module 127 comprising hub wheels 307a and 307b and the brakes 220b and 220b with brake sensor 221a, 221b.

FIG. 5C shows the steering column's 107 adjustable stem section 108 is raised and FIG. 5D shows the steering column's 107 adjustable stem section 109 is lowered. Accordingly, the adjustable stem sections 108/109 are constructed to lock the steering column 107 in place with coupling joint 215. The steering column 107 is constructively configured with an adjustable stem tapped holes 213 horizontally space and a nob bolt 214, the nob bolt 214 is mainly used to lock the steering column 107 in place at a coupling joint 215 intersection.

In various ways the electrical system is shown internally wired within the steering column stem sections 108, and 109 as FIG. 5A, FIG. 5B, FIG. 5C and FIG. 5D illustrate and wherein the cabling harness is shown adjusting to the variable set positions as exampled in FIG. 5D. In some element of the framework construction, the construction may include a base configured with a seat, the seat constructively mounted to the base and configurable to adjust to a predetermined position allowing the user to stand, lean or sit during operation, and also a retractable locking pin assembly not shown, which may be mounted to the front frame end and mounted to the rear frame end, the retractable locking pin assembly being configured to thereby lock the front and rear powered trucks restricting each from rotating over approximately 160 degrees about the axis.

In greater detail FIG. 6A a controller module 600 for controlling the intended direction and speed control of the hub wheel and brake assembly provided by the propulsion system 300 wherein, the controller module 600 comprises and utilizes: a grip force sensor 601, a grip force signal 602, a drive signal 603, an intended traveling speed 604 and a braking momentum 605, a control signal 606 and a control drive signal 607, a fall prevention sensor 608 and a fall prevention sensor signal 609, and an operational control mode 714, and the steering actuator 129. In various elements the controller module 600 employs the operational control mode 714 coordinates several process steps of the steering column components such as: the controller module 600 comprises switches to engage and disengage the grip force sensor 601, the grip force signal 602, and the drive signal 603 of the steering column handlebar. The grip force sensor 601 may be a multi-axis sensor that detects both magnitude and direction of a force applied to the grip handle's throttles 115/116. The grip force sensor 602 maintained in the grip handle 113 detects the force applied to the grip handle 113 and provides a grip force signal 602 to the controller module 600 and uses the grip force signal 602 to calculate and provide a drive signal 603 that causes the vehicle to travel at the users intended traveling speed 604 and braking momentum 605.

In one example, the propulsion system 300, the propulsion system employs the electrical system 217 for regulating DC battery 218 power to engage the hub wheel brakes 220 to slow down or to stop, in one aspect the grip handle 113 employs brake throttle 115 and speed throttle 116 "projection," e.g., the user's 105 hand throttles 115/116 are forced via fore and aft wrist thrust. When the user 105 pushes the left grip handle 113a in a forward direction this employs the brakes 220, the grip handle's 113 grip force sensor 601 to signal the controller module 600 and to determine the orientation of the brake 220 via the brake sensors 221 as shown in FIG. 5B, as the brake sensor 221 is used for signaling information respectively by the grip force signal 602 it will indicate to the controller module 600 what to instruct, for example, the hub wheel controller 223 instruction are to engage the hub wheel's brake 220 to slow or to stop the hub wheel's drive motor 222, this is achieved by the users projection applied to the brake throttle 115. The same scenario is applied for the speed throttle to control the DC battery 218 power to engage the drive motor 222 of the hub wheel assemblies 306.

In one element a speed throttle 116 projection corresponds to a desired direction and speed of travel. When the user 105 pushes the grip handle 113 in a forward direction, a grip handle's sensor signal 114 signals the controller module 600 the orientation angle θ and also, the sensor signal 114 will indicate to the controller module 600 the user's 105 speed throttle 116 projection that corresponds to the direction and speed in which the user 105 wishes to travel.

In one element a balance control sensor 604 and a balance signal 605 provided by the sensor devices of the balance control sensor 604 is indicative of an orientation force caused by the hub wheels 307.

In one element a controller module 600 receives the balance signal 605 and calculates the user's weight projection and determines an angular speed and direction of the hub wheel assemblies 306 that will cause one or more hub wheels 307 to travel at the user's speed and direction. The controller module 600 then outputs a drive signal 607 to the steering actuator 129 to rotate as arrow (A4) shows in FIG. 4C, the steering actuator 129 is employed to laterally rotate the hub wheel 307a clockwise and counter clockwise. In one element the controller 600 outs a drive signal 607 to a series of steering actuators 129a and 129b to laterally rotate a series of hub wheels 307a and 307b the pair work simultaneous rotate in the same direction as arrows (A5) show in FIG. 4C.

In greater detail FIG. 6B the controller module 600 programmed with operational control mode 714 process algorithms 733 allows the vehicle 100 to be operated in various modes: a fall-prevention mode with a sensor 608 that quickly provides a counter force to a user's falling projection. For example, when a user of a bicycle 103 is about to lose his or her balance, he or she instinctively reacts by strongly gripping the handles. Embodiments may use this sudden fluctuation of a user's gripping force applied to the grip handle 113 to predict that the user is losing his or her balance and to react accordingly by switching from a user balance assist mode 611 utilizing a fall prevention mode 712 employing a fall prevention sensor 608 which is carried out by a fall prevention signal 609.

The control mode, can be referred to as 'balance mode,' 720 wherein the bicycle 103 may station keep in a balanced position and may be provided by a sensor signal 725 such as, for example, an inertia sensor which is incorporated herein by reference to the a rate w of wheel rotation (e.g., front propulsion system 301, and rear propulsion system 302), while is also integrated up by an integrator (not shown) so that the wheel rotation required to bring the bicycle 103 to a pitch state of stasis is maintained. Integrator may be initialized at a given value when detected by the "inertia" "sensor signal 725".

The bicycle frame 103 and hub wheel 307a and 307b embodiments to which the configuration in which the stability in the fore-aft plane at least a portion of the time with respect to a vertical (axis z) is relatively stable with respect to a vertical in the lateral plane.

In one element of the steering column 107 center of mass (CM) 722 must lie on a vertical line 723 that passes through the region of contact between hub wheel 307a and 307b embodiments and the underlying surface if the bicycle 103 to remain at rest. Otherwise, the yaw of the steering column 107 will cause the hub wheel 307a and 307b embodiments to rotate under said bicycle accordingly to achieve balance stability, and thus motion will ensue.

In some implementations, a control module 600 that projects range data received within the LIDAR 123 and turns the data into spherical coordinates. The control module 600 may further use an elevation map that matches up with the location of the range data received within the LIDAR 123 scans to determine any points within the 3D points that correspond to objects without any elevation. The control module 600 may remove, in some instances, any points that do not display a particular amount of elevation, which may be defined or predetermined. By removing any points that do not include elevation, the control module 600 may focus upon and utilize the points that correspond to actual physical objects rather than points that correspond to the road or ground.

In FIG. 6B the grip force sensor 601 may provide a grip force signal 602 in response to a sudden increase of force applied to the grip handle 113 by a user. The controller module 600 receives the grip force signal 602. If the grip force signal 602 is greater than a grip force threshold value, for example, the controller module 600 is employed to manage an operational control mode 710 from the user balance assist mode 711 to a fall prevention signal 609 in accordance with the computer executable instructions stored in the memory 705. During a fall prevention mode 712, the controller module 600 may sample the balance signal 605 of the balance control sensor 604 at an increased frequency over the sampling frequency during a balance assist mode 711 to quickly react to the potential fall of the user 105. The controller module 600 samples the balance signal 605 to calculate the orientation of the vehicles as described above. The orientation of the user grip force projection is indicative of the user's balance projection which would indicate the user is not present on the vehicle. When user is not detected the vehicle switched to a kickstand mode 713, a microprocessor 701 (or central processing unit (CPU) is employed to balance the bicycle upright center of mass (CM) 714 steadfast on vertical that passes through the region of contact between hub wheel 307a and 307b embodiments and the underlying surface if the bicycle 103 is to remain stable during kickstand mode 713.

In various elements the electric gyro 715 algorithms 733 are configured to maintain the center of mass (CM) 714 by means of a 3 axis accelerometer 717 to maintain "Stability" to keep the bicycle or vehicle "stable," as used in this description refers to the mechanical condition of an operating position with respect to a paddle encoder 716 which the autonomous control system 700 will naturally return if the autonomous control system 700 is disturbed away from the operating position in any respect.

A wireless communication system 702 is configured to communicate with sensing devices of the computing system 600 with the autonomous control system 700 (e.g., comprised with the control module 130 which housed within the control panel 119).

In greater detail FIG. 7 is a flowchart of the autonomous control system 700 includes a microprocessor 701 and the wireless communication system 702 including wireless transmitters and receivers configured to communicate with an array of sensor units 703 detailed herein.

More specifically, the microprocessor 701 (or central processing unit (CPU) and a data bus 704 including read/write (R/W) lines and read-only (RO) lines, that connects the microprocessor 701 with one or more of a read-and-write or random-access memory (RAM), an erasable-programmable read-only memory (EPROM) flash memory referred to herein simply as memory 705, and it will be understood that the memory 705 can within the spirit and scope of the invention take different forms or can be differently partitioned to provide for the temporary or permanent or semi-permanent storage of instructions and/or data in any suitable form. A "microcontroller", can be referred to as "microprocessor" 701 also includes a serial port 706 (e.g. a universal serial bus (USB) also 120) for system software 707 uploading and data or status output. Finally, microcontroller 701 includes and the wireless communication system 702 could include transceivers configured to communicate with vehicle control module 600. Those of skill in the art will appreciate that microcontroller 701 can be operated conventionally from a direct current (DC) power source such as the twelve-volt (12V) battery 218 or a lithium battery pack.

Those of skill in the art also will appreciate that a microcontroller is programmed to execute software instructions stored at least temporarily in a memory and executed in a microprocessor 703. The provision in the control and power control system 712 described and illustrated herein of one or more Universal Serial Bus (USB) ports 706/120 provides for pre-production software/firmware development and/or post-production software revisions and/or upgrades. The USB port 706/120 enables the control module 130, for example, to be connected to the microcontrollers, not shown, and to over-write and/or otherwise modify instructions and/or data stored in the microcontroller's memory 705. Such will be understood to enable straight-forward and so-called 'on-the-fly' functional and behavioral changes to be made any time they are needed, as well as to add functionality as smarter control algorithms are developed e.g., simplified control algorithm 733 for achieving balance in the embodiment of the invention accordingly when the propulsion wheels 112, 113 are active for locomotion.

Those of skill in the art will also appreciate that the microcontroller and associated software implementation can utilize any suitable operational control (OCs) modes 710 such as a real-time operating system (RTOS) utilizing algorithms 733 configured to comprise coding from control programming languages, software toolkits, etc.

In greater detail FIG. 7 the computing system 700 may receive input from a user 105 and varying degrees of assistance from computing devices 701, micro-processors 702, and an array of autonomous drive control sensor units 703 that provide the vehicle's autonomous control system 700 with information about the surrounding environment of the vehicle 100, including information regarding the detection and location of objects.

The vehicle 100 may use LIDAR sensor unit 123 and/or other laser range-based sensors to gather information about nearby objects through the use of lasers or other means. For example, an array of sensor units 703 include any combination of: a short range laser, acoustic sensor, range finders and other sensor and their sensor signal 725 examples are possible for different scenarios depending on the vehicle 100 embodiments integrated with system elements listed herein which can communicatively link to a wireless communication system 702 or (WCS) and by a vehicle input/output (I/O) port 737.

The autonomous control system comprising methodologies to coordinate an semi-autonomous process operatively engaging control of front and rear propulsion systems via control modes selected by user, control modes to include: a control mode to engage a front propulsion system and a control mode to engage a rear propulsion system; a semi-autonomous process to operatively engage control of throttle speed and throttle brake actions, and a semi-autonomous process to operatively engage control of the steering column to engage the front and rear steering actuators.

In various elements the autonomously control system further comprises: a navigation and control system comprising one or more position sensors configured to generate position signals indicative of the location and heading of a vehicle; one or more operation control mechanisms having inputs and producing outputs which control an operation of the vehicle; and a self-contained autonomous controller disposed remote from the operation control mechanisms comprising: a processor configured to receive the position signals from the position sensors and to generate operation control signals defining an updated travel path for the vehicle; one or more cameras having a means to view environment objects, and include wireless interface communication link; an I/O interface system utilizing satellite GPS; the control system comprising a means for systematically employing one or more environmental scanners, and comprising wireless interface communication linked to short range proximity sensors including LIDAR or other laser sensor unit; one or more sensors including; electric gyros, a paddle encoder, a 3-axis accelerometer, a low-speedometer, a driver expertise switch, a steering encoder, an electrical system, a battery charge level sensor, a throttle sensor, a speedometer, a sensor signal; a balance control mode, a propulsion system signal, a forward and reverse switch, a front and rear brake signal, a brake sensor signal, a drive sensor with drive signal, a balance control sensor with a balance control signal having a center of mass respective of a kickstand mode to balance the vehicle when the vehicle is at stop and at low speed; a programmable interface providing communication among the position sensors, the operation control mechanisms, and the processor, and configured to normalize inputs to the processor from the position sensors and to generate compatible operation control signals applied as the inputs to the operation control mechanisms, whereby the self-contained autonomous controller is configurable for operation with a variety of different sensors and different operation control mechanisms including; a switch function to activate: an autopilot or a semi-autonomous control system mode to steer a vehicle to the right or to the left; to activate a front steering actuator and a rear steering actuator configured to steer one or more ground contacting members of a vehicle; to activate one or more transmitters and receivers to communicate with an array of sensor units and control motors by means of Bluetooth, WIFI, Cloud and via I/O Internet; and a user control means to control the vehicle manually; and comprising a wireless communication control method employing Bluetooth connected control elements to control vehicle motion when user is onboard or to control vehicle motion from afar when user is not onboard; and activate a forward steering setting to semi-autonomously steer a vehicle to the right or to the left.

The flowchart the autonomous control system 700 elements include at least that of: one or more electric gyros 715, a paddle encoder 716, a 3 axis accelerometer 717, a low-speedometer 718, a driver expertise switch 719, a steering encoder 720, an electrical system 721, a battery charge level sensor 722, a throttle sensor 723, a speedometer 724, a sensor signal 325, a balance control mode 726, a propulsion system signal 727, a forward/reverse switch 728, a front/rear brake signal 729, a brake sensor signal 730, a drive sensor with drive signal 731, a balance control sensor with a balance control signal 732 having a center of mass 714 respective of the afore mentioned operational control modes 710.

The operational control modes 710 having algorithms 733, each have a purpose for controlling the one or more hub wheel drive motors 307 of the vehicles. A computer and a control process for the steering operation of the vehicle; a machine interface control panel configured with a control system, said control system comprising a central control unit CPU; at least one hub wheel speed sensor, a left and right drive motor comprising feedback control loops; a tilt sensor, the tilt sensor is fixed on an angle sensor and is reflected by a vertical line as a reference of the user standing or sitting positions and said attitude sensor module used to control the balance of the vehicle, and, at least that of an electric gyro sensor, a gravity sensor, an acoustic sensor, an attitude sensor or the like; an attitude sensor to include a simplified control algorithm for achieving balance when the wheels are active for locomotion, and the equations of a control loop applied to hub wheel torque to achieve balance.

In one element the laser sensor unit or "LIDAR unit 131" is moveable in a scanning fashion within a particular range of angles and/or azimuths to obtain information from each direction around the vehicle 100, the LIDAR sensor unit 123 and laser signal 734 respectively utilizing various algorithms 733.

The autonomous control system 700 microprocessor 701 and the wireless communication system 702 including wireless transmitters and receivers utilizing; GPS satellite, WIFI, Bluetooth, Cloud base being configured to communicate with various systems and sensors units 703 said sensor units 703 employing sensor signals 725 to control the vehicle from afar via a manual control mode selected by the vehicle user.

The camera 136 could be mounted inside a front section of the steering column's top stem section 108. Specifically, as illustrated, the camera 136 could capture images from a forward-looking view with respect to the vehicle 100, the camera control system 735, may have mounting locations for one or more cameras 136 respectively utilizing various algorithm 733 elements are possible according to fabrication and manufacturing process 200.

The vehicular input/output (I/O) port 737 respectively utilizing various wireless communication networks, examples of such vehicular communication systems may include dedicated short range communications (DSRC) 708, radio frequency identification (RFID) 709, and other proposed communication standards directed towards intelligent transport systems via a parallel input/output (I/O) port 737 for input and/or output from various sensors units 703 with related signals 725 respectively utilizing various algorithms 733 and programs are thusly managed by the CPU computing system 121 and by inputs from a user 105 employing a user interface system 736, and the user engaging the control panel's LED touchscreen 132 inputs/outputs, displays, and etc. to switch modes to engage the following processes:

A) a method of user's hand or thumb to apply pressure to a thumbwheel switch to activate an autonomous control system mode;

B) a method of a front steering actuator and a rear steering actuator being operable to steer a vehicle autonomously;

C) a method of a forward steering setting and a method to semi-autonomously steer a vehicle to the right or to the left;

D) a method of a user's hand applying grip force to right and left grip handles;

E) a method of a user's hand or thumb to apply pressure to a thumbwheel switch to activate brake setting;

F) a method to activate a kill switch when user is off balance or vehicle body is off balance with respect to the dynamic changes the angle formed by the vertical line during driving operation;

G) a method for maintaining stability and for detecting the absence of a user aboard;

H) a method for determining a pitch such as to establish the center of mass;

I) a method for applying a torque to one or more laterally disposed ground-contacting members so as to maintain the mobility vehicle at the desired pitch;

J) an automatic stand-up mechanism to control the lean of the mobility vehicle as necessary such as at stops, low speeds, and attaining left and right relative to a central plane of the mobility vehicle at approximately 5° or more degrees.

In some embodiments of vehicles comprising autonomous steering column system the method of manufacturing the vehicles 101-103 and multi-passenger vehicle 104 assembly may include at least those steps identified and similar framework construction and hub wheel assemblies can be applied to other vehicles not disclosed in the above paragraphs. It is also within the scope and spirit of the present invention to omit steps, include additional steps, and/or modify the order presented above.

The user interface system 736 allows the user 105 of the vehicle to employ the manual drive mode 701, for this purpose the user physically drives the vehicle by engaging the driving components of the steering column 107, the steering column 107 is capable of integrating in vehicles that are not described in the drawings, to those skilled in the art, the steering column can be configured in medical mobility vehicles, robotic mobility vehicles, and sport and off road vehicles, and also vehicles for hire and for ride sharing. The vehicles mentioned may be configured with a roof, doors, windows, and other amenities.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A vehicle comprising:
   a frame construction to suit: medical mobility vehicles, robot vehicles, sport vehicles, off road vehicles, vehicles for hire or for ride sharing;
   said frame configured with opposing front and rear ends;
   one or more seats, said one or more seats configured to support one or more users;
   an arrangement of foot pedals or a platform providing footing support;
   one or more hub wheels comprising a drive motor, said drive motor including a DC motor type with rotor, stator, gears; or
   one or more truck assemblies comprising a drive motor, the drive motor being a DC hub motor type with rotor, stator, and gears;
   one or more braking devices,
   a platform configured with a contoured construction, and said platform to compartmentalize system components;
   a base having an underlying surface characterized by a center of mass to support a user of the vehicle who's either standing or sitting during driving operation;
   a seat constructively configured on said base, the seat being configured for user to sit on, or to rest an appendage on;
   a powered steering column, pivotally mounted to the front end of the frame, said steering column operatively engaged to propulsion system components;
   an array of conduit supporting an array of power cable harnessed within vehicle framework;
   one or more fenders;
   a control panel affixed to said powered steering column, said control panel comprising a control module including a user I/O interface system;
   one or more steering actuators and steering actuator couplings; a retractable locking pin assembly for preventing over rotation;
   a handlebar rigidly attached to said steering column, said handlebar being used to turn the steering column both manually or autonomously via said steering actuator;
   one or more grip handles situated on said handlebar for user to control power level to throttle and brakes;
   one or more thumbwheel switches for user to engage power ON/OFF;
   a headlight, a taillight including brake, and turn signal lights;
   said powered steering column operatively engaged to a yoke intersection situated on the frame's front end;
   a control panel, a power control system connecting to electrical components;
   a Lidar sensor and system sensors situated on the vehicle;
   one or more cameras having a means to view parameters via a wireless interface communication link, a I/O interface system utilizing local mapping and satellite GPS;
   a wireless communication control method to include a Bluetooth communication device for controlling the vehicle motion from afar;
   an autonomous control system; the autonomous control system comprising a means for systematically employing short range proximity sensors including LIDAR, and an environmental scanner laser system to detect objects;
   a manual drive mode, an autopilot mode, and a semi-autonomous drive mode, an autonomous drive system;
   a kickstand mode; an operational control mode, and a balance control mode;
   a battery bank, a battery charger, and a wiring connection means furnishing a controlled power source to vehicle system components with one or more charger ports that provide external charging via USB power cable.

2. The vehicle of claim 1 in which said frame further comprising:
   an array of conduit tubing constructed with metal, or carbon fiber, or plastic or a combination thereof, and one or more compartments rigidity mounted to said frame, said one or more compartments for housing vehicle system components;
   a front end pivotally mounted to a steering column, said steering column operatively engaged to front propulsion system, said front propulsion system for structural support the frame's front end;
a rear end pivotally mounted to a rear propulsion system, said rear propulsion system for structural support of the frame's rear end;
said propulsion system arrangements comprising one or more: hub wheels and truck assemblies, steering actuators;
an array sensor units and accelerometers which may include; an electric gyroscope, IMU, MEMS, an altitude sensor, 3 axis accelerometers, and a gravity sensor, an acoustic sensor, and other sensing system devices;
a platform and a base configured to support one or more users of the vehicle; the platform configured to stand upon;
one or more seats, said seat being configured to reposition, the seat for a user to sit on and to rest an appendage on;
one or more coupling mechanisms and bracketing assemblies including bolts, and nuts.

3. The vehicle of claim 1 in which said frame further comprising:
a coupling mechanism for connecting said front frame end to said steering column;
said coupling mechanism providing a connection link between said steering column and said yoke module.

4. The vehicle of claim 1 in which said frame further comprising:
a coupling mechanism, said coupling mechanism configured for connecting said frame front end to said DC drive motor arrangement.

5. The vehicle of claim 1 in which said frame further comprising a coupling mechanism, said coupling mechanism configured for connecting said frame rear end to said DC drive motor arrangement.

6. The vehicle of claim 1 in which said steering column further comprising:
a control panel and a control module, said control panel configured with an I/O interface system to transfer information between internal storage and external I/O control system and devices;
a display monitor for user interface, said control module to relay user input;
a LIDAR sensor unit, said LIDAR sensor unit comprising a moveable means to obtain object information from a direction around the vehicle's front environment;
an autonomous drive system sensing system and cameras to detect objects around the vehicle's front environment;
a lighting system comprising head lamp and front turning signals.

7. The vehicle of claim 1 further comprising:
one or more truck assemblies, said one or more truck assemblies comprising a DC motor configured with rotor, stator, and gears and a right axis and a left axis;
a differential drive motor controller with feedback loops;
one or more truck assemblies comprising: a drive motor, the drive motor being a DC hub motor type with rotor, stator, gears, and one or more braking devices, or
a powered truck mounted proximate to revolve around a lateral pivot axis of the steering column, or
a fork yoke module mounted proximate to revolve around a lateral pivot axis of the steering column, or
a cantilevered yoke module mounted proximate to revolve around the steering column.

8. The vehicle of claim 1 in which said powered steering column further comprising a retractable locking pin assembly to restrict over rotation during a steering maneuver of a less than approximately 160 degrees about the axis.

9. The vehicle of claim 1 in which control subsystems further comprising:
an operational control mode, said operational control mode for user to select one or more drive control system; a manual drive mode, a semi-autonomous drive mode, an autopilot mode, a balance control mode linking with a kickstand mode comprising, an automatic stand-up mechanism providing center of mass (CM) position;
cameras having a means to view parameters and including a wireless interface communication link,
I/O interface system utilizing satellite GPS; said control system comprising a means for systematically employing one or more environmental scanners;
a wireless interface communication linked to: short range proximity sensors including LIDAR or laser sensor unit;
one or more electric gyros, a paddle encoder, a 3 axis accelerometer, a low-speedometer, a driver expertise switch, a steering encoder;
an electrical system, a battery charge level sensor, a throttle sensor, a speedometer, a sensor signal, a balance control mode, a propulsion system signal, a forward/reverse switch, a front/rear brake signal, a brake sensor signal, a drive sensor with drive signal, a balance control sensor with a balance control signal having a center of mass respective of a kickstand mode to balance the vehicle and the afore mentioned operational control modes;
an operational control mode, said operational control mode for user to select one or more drive control system;
a manual drive mode, a semi-autonomous drive mode, an autopilot mode, a balance control mode linking with a kickstand mode comprising and an automatic stand-up mechanism providing center of mass (CM) position.

10. The vehicle of claim 1 in which said control system further comprising:
an I/O interface system utilizing local mapping and satellite GPS;
an array of control system I/O devices including: one or more cameras to monitor vehicle parameters;
an array of sensors including; short range proximity sensors, a LIDAR system, and other sensory devices, for obtaining object data in said vehicle's environment;
a wireless interface system including WIFI;
a wireless interface system including Bluetooth device;
a wireless interface system including Cloud management systems.

11. The vehicle of claim 1 in which said frame further comprising: an array of foot rest or foot pedals situated on a section of said frame, on the platform, and on the base of a mobility vehicle.

12. The vehicle of claim 1 in which said steering column further comprising:
a handlebar configured with a manual switch, said manual switch situated accordingly on said handlebar and said manual switch to engage autonomous control system when switched on by vehicle user;
a semi-autonomous process operatively engaging control of front and rear propulsion systems via control modes selected by user, control modes to include: a control mode to engage a front propulsion system and a control mode to engage a rear propulsion system;

a semi-autonomous process operatively engaging control of throttle speed and throttle brake actions;
a semi-autonomous processor operatively engaging control of the steering column to engage the said front and rear steering actuators;
a kill switch and a control method of the kill switch to shut off power to the one or more hub motors when user is off-balance, or the vehicle body is off-balance with respect to the dynamic changes the angle formed by the vertical line during driving operation.

13. The vehicle of claim 1 in which said handle bar further comprising:
at least one grip handle situated on said steering column, said grip handle further comprising:
an adjustable throttle controller to control the speed and brake for controlled forward and reverse steering actions;
a grip force sensor;
a thumbwheel switch situated on the handlebar, said thumbwheel switch to turn left or right signal lights, said turn signal lights situated on frame end and on said steering column.

14. The vehicle of claim 1 in which said control panel further comprising an ON/OFF switch allowing user to engage a front headlight, rear lights, and turn signal lights.

15. The vehicle of claim 1 in which said frame further comprising:
a powered truck module, wherein said powered truck module including; a left axle and right axle, said left and right axles coupled to a left and right DC powered hub wheels providing differential drive forward and reverse steering motions, said truck module comprising a containment of wiring array connecting to a controlled DC power source.

16. A mobility vehicle system comprising:
a frame configured with contoured conduit and yoke construction fabricated with metal, carbon fiber, plastic or a combination thereof;
a powered steering column system pivotally mounted to the front end of the frame, said steering column operatively engaged to propulsion system components including; a front hub wheel and a rear hub wheel, said hub wheel comprising a DC drive motor, axle, and a braking means,
one or more steering actuators and steering actuator couplings,
a retractable locking pin assembly for restricted over rotation of said steering column turning motion,
a handlebar rigidly attached to said powered steering column to steer said front hub wheel by a manual or semi-autonomous control means, or by an autonomous control system;
a control panel comprising wherein, a control module and a user interface system;
an ON/OFF switch allowing user to engage power to: said powered steering column system components, said user interface system control module, said propulsion system components including a front headlight, rear lights, and turn signal lights;
a compartment configured with a cavity and locking access panel for housing;
a control system and processors, for controlling drive operations of said mobility vehicle;
a machine interface control panel, for said user interface system, configured with a control system, said control system comprising a wireless interface communication system connectively linked with WIFI, Internet and Cloud management systems, and Bluetooth;
a manual drive mode, a semi-autonomous drive mode, or autonomous control system utilizing subsystem modes and I/O interface system utilizing local mapping and satellite GPS;
said autonomous control system comprising:
short range proximity sensors and one or more environmental scanners, said one or more environmental scanners comprising wireless interface communication;
a LIDAR system utilizing control algorithms comprising particular range of angles and azimuths to obtain information around the proximity of said mobility vehicle; a short-range LIDAR sensor unit with rotating platform situated on a section of said mobility vehicle;
said autonomous control system comprising a computing system employed for communicating with a propulsion system, said propulsion system employing one or more DC motors;
an electric gyroscopic sensor with a simplified control algorithm for locomotion, and a control loop equation applied to motor torque;
a wireless communication system, WIFI, Bluetooth, and Cloud management systems;
one or more environmental scanners, and comprising wireless interface communication linked to short range proximity sensors;
an electric gyro sensor, a gravity sensor, an acoustic sensor, an attitude sensor to include tilt sensor, tilt sensor is fixe d on an angle sensor and is reflected by a vertical line as a reference of the user standing or sitting positions, said attitude sensor module used to control the balance of the vehicle;
a simplified control algorithm for achieving balance when the wheels are active for locomotion, and the equations of a control loop applied to hub wheel torque to achieve balance;
a control algorithm for achieving balance when said hub wheel is actively driving in forward or in reverse directions, and the equations of a control loop applied to hub wheel torque to achieve balance of said vehicle when stationary, via a kickstand mode;
a Bluetooth controller device, said Bluetooth controller device providing a manual controlling means for controlling hub wheels motion and steering direction via user engaging a manual control mode of a Bluetooth connected cell phone device;
a processor to activate a kill switch when a rider/operator is not detected, or a mishap occurs;
a battery bank with charger; or an interchangeable lithium battery pack to extend riding time;
one or more charger ports that provides external charging and USB power cable.

17. The mobility vehicle of claim 1 or claim 16 further comprising said seat constructively configured to readjust to a predetermined position for a user to sit on, or for said user to rest an appendage on; said seat further comprising a locking hinge pilotable by a fixed cross pin configuration.

18. A vehicle comprising:
a frame, said frame configured for different vehicle types, a vehicle type including; bicycles, medical mobility vehicles, robot vehicles, sport vehicles, off road vehicles, vehicles for hire and for ride sharing;
said frame fabricated with metal, carbon fiber, plastic, or a combination thereof;

a base configured with one or more seats, said seat constructively mounted to said base;

a steering column configured with a front powered truck comprising one or more hub wheels;

a rear DC powered truck module comprising one or more hub wheels comprising a brake;

said a steering column further comprising:
- a steering actuator, a steering system, said steering system for controlling the steering operation of said vehicle;
- a machine interface control panel configured with a control system;
- one or more powered trucks, said one or more powered trucks comprising hub wheel assemblies, said hub wheel assemblies including a DC motor, said DC motor having a stator portion disposed at a fixed position relative to an axle of said powered truck;
- said powered truck further comprising a left and right differential drive and a motor controller, said motor controller for controlling the variable speeds of left and right DC motor and braking momentum;
- a power supply connection linked to said motor controller of said DC motor.

19. The mobility vehicle of claim 1 or claim 18 in which vehicle frame further comprising:
- a base to support a user who's standing or sitting during operation;
- said frame configurable to self-balance at a predetermined vertical position;
- a front and a rear DC powered truck module;
- a plurality of said DC powered hub wheel assemblies;
- said front DC powered truck module operatively engaged with at least one or more hub wheel arrays; or
- at least one DC powered truck module rigidly mounted to said steering column;
- said steering column operatively engaged, via control system mode, to systematically steer said front hub wheels;
- said powered rear hub wheel assembly comprising one or more hub wheels mounted to a steering motor.

20. The vehicle frame of claim 1 or claim 18 further comprising:
- an array of tubing, said tubing fabricated with metal, carbon fiber, plastic or a combination thereof;
- a support platform to include a rigid frame;
- a base to support at least one or more seats, said one or more seats constructively mounted thereon, said seat configured to support at least one rider, or a seat configured to rest an appendage on;
- an array of sensoring devices including at least that of; an accelerometer, and an attitude sensor to include tilt sensor, tilt sensor is fixed on an angle sensor reflected by a vertical line as a reference of the riding that is standing, leaning, or at sitting position;
- an array of input and output sensor devices;
- a yoke module having preferred dimensions having a conduit configuration to contain an array of power cable;
- a fender mounted onto a yoke module intersection via couplings;
- an array of USB power cable and plugs connecting to vehicle system components;
- an array of electrical cable connecting to a charger port that provides external charging power supply;
- said hub wheel further comprising a hub motor brake characterized by regenerative braking to charge a battery that is operatively coupled with an electric drive motor;
- an array of USB power cable plug connections.

* * * * *